(12) United States Patent
Kujda et al.

(10) Patent No.: US 9,046,985 B2
(45) Date of Patent: *Jun. 2, 2015

(54) VISUAL BROWSING SYSTEM AND METHOD

(75) Inventors: David Kujda, Santa Monica, CA (US);
Andrew Olcott, Newtonville, MA (US);
Eden Soto, Palm Coast, FL (US)

(73) Assignee: Yahoo! Inc., Sunnyvale, CA (US)

( * ) Notice: Subject to any disclaimer, the term of this patent is extended or adjusted under 35 U.S.C. 154(b) by 468 days.

This patent is subject to a terminal disclaimer.

(21) Appl. No.: 13/268,219

(22) Filed: Oct. 7, 2011

(65) Prior Publication Data

US 2012/0030629 A1 Feb. 2, 2012

Related U.S. Application Data

(63) Continuation of application No. 11/753,527, filed on May 24, 2007, now Pat. No. 8,037,424.

(51) Int. Cl.
*G06F 3/0481* (2013.01)
*G06F 3/0482* (2013.01)
*G06F 3/0485* (2013.01)
*G06F 3/0484* (2013.01)

(52) U.S. Cl.
CPC ............ *G06F 3/0481* (2013.01); *G06F 3/0482* (2013.01); *G06F 3/0485* (2013.01); *G06F 3/0484* (2013.01)

(58) Field of Classification Search
CPC ........................................ G06F 3/048–3/04897
USPC .................. 715/815, 823, 828, 835, 841, 978
See application file for complete search history.

(56) References Cited

U.S. PATENT DOCUMENTS

| | | | |
|---|---|---|---|
| 5,565,888 A | 10/1996 | Selker | |
| 5,973,694 A * | 10/1999 | Steele et al. | 715/835 |
| 6,252,597 B1 | 6/2001 | Lokuge | |
| 6,268,854 B1 * | 7/2001 | Borden et al. | 715/786 |
| 6,442,523 B1 | 8/2002 | Siegel | |
| 7,152,210 B1 * | 12/2006 | Van Den Hoven et al. | 715/723 |
| 7,350,157 B1 | 3/2008 | Billmaier et al. | |
| 2002/0140746 A1 * | 10/2002 | Gargi | 345/853 |
| 2003/0117440 A1 * | 6/2003 | Hellyar et al. | 345/767 |
| 2005/0086611 A1 | 4/2005 | Takabe et al. | |
| 2006/0069998 A1 * | 3/2006 | Artman et al. | 715/721 |
| 2007/0168413 A1 * | 7/2007 | Barletta et al. | 709/203 |
| 2007/0174788 A1 | 7/2007 | Ording | |
| 2007/0261001 A1 | 11/2007 | Nagiyama et al. | |

(Continued)

OTHER PUBLICATIONS

"Windows 98 Magnifier and Mouse Settings: Using the Magnifier", Windows 98: Magnifier and Mouse Settings—Lesson 16, 1998, downloaded May 3, 2011 from http://www.gcflearnfree.or.

(Continued)

*Primary Examiner* — Kieu Vu
*Assistant Examiner* — Shangao Zhang
(74) *Attorney, Agent, or Firm* — Hickman Palermo Becker Bingham LLP; Edward A. Becker (57) ABSTRACT

A visual browsing method allows a user to look at an item closely by hovering over, instead of clicking on, an icon representing the item. The method also enables the user to browse items in different levels of a multiple level category without waiting for web pages to be loaded, to know where he/she has been in the multiple level category, and to back up if he/she likes. The method makes the browsing process faster and easier.

26 Claims, 10 Drawing Sheets

(56) References Cited

U.S. PATENT DOCUMENTS

| | | | |
|---|---|---|---|
| 2008/0118160 A1* | 5/2008 | Fan et al. | 382/225 |
| 2008/0126958 A1* | 5/2008 | Louie | 715/764 |
| 2008/0295008 A1 | 11/2008 | Kujda et al. | |
| 2009/0106696 A1 | 4/2009 | Duarte | |

OTHER PUBLICATIONS

"Step by Step Tutorials for Windows XP: Magnifier: Turn On and Use Magnifier", 2003, downloaded May 3, 2011 from http://microsoft.com/enable/training/windowsxp/magnifierturnon.as.

* cited by examiner

VISUAL BROWSING SYSTEM AND METHOD

CROSS-REFERENCE TO RELATED APPLICATIONS; BENEFIT CLAIM

This application claims the benefit as a Continuation of application Ser. No. 11/753,527 filed May 24, 2007, the entire content of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

BACKGROUND

1. Field of the Invention

The present invention relates generally to visual browsing, and more particularly to a method that will allow a user to browse information in a multiple level category without having to wait for web pages to be loaded.

2. Description of Related Art

Many on-line shopping websites today present items in a multiple level category on related web pages. If a user is interested in an item in the category, the user usually has to click on a button on the category's web page for a sub-category that may contain that item. The user is then presented a web page for the sub-category, with information for the selected sub-category shown thereon. If the category has a number of levels of sub-categories, the user may have to go through a number of web pages. The user has to wait for each page to load, and can only view one page at a time. As a result, the user may not be aware of the contents of multiple levels at the same time.

Figure 1A:
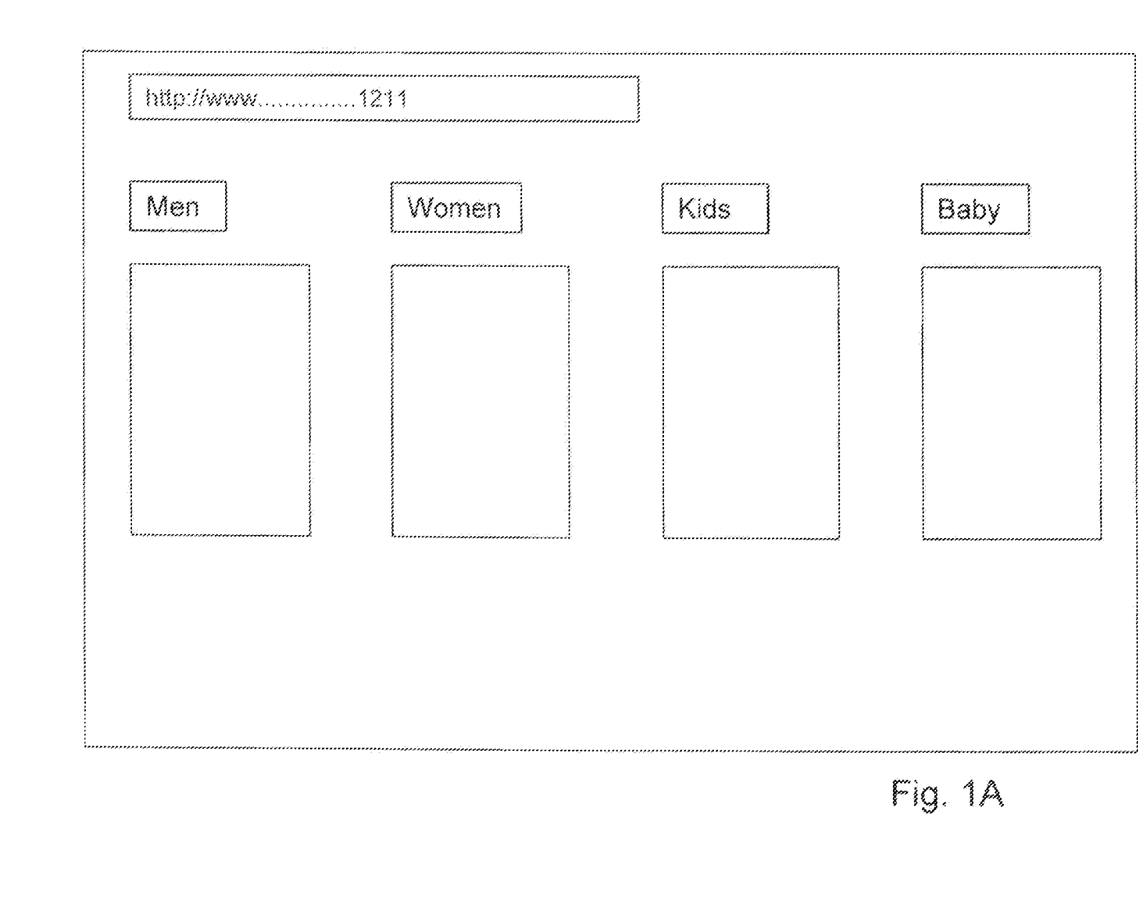
FIGS. 1A, 1B, 1C and 1D illustrate user interfaces of an existing on-line shopping website.

FIGS. 1A, 1B, 1C and 1D illustrate user interfaces of a conventional on-line website, in this case a shopping website. The user interface in FIG. 1A shows four first level categories, "men", "women", "kids" and "baby". Four pictures, each representing a category, may be shown in the middle of the web page in FIG. 1A. If the user were interested in the category "women", the user would click on the word "women" on the web page. A web page such as the one shown in FIG. 1B then would be loaded and presented to the user.

Figure 1B:
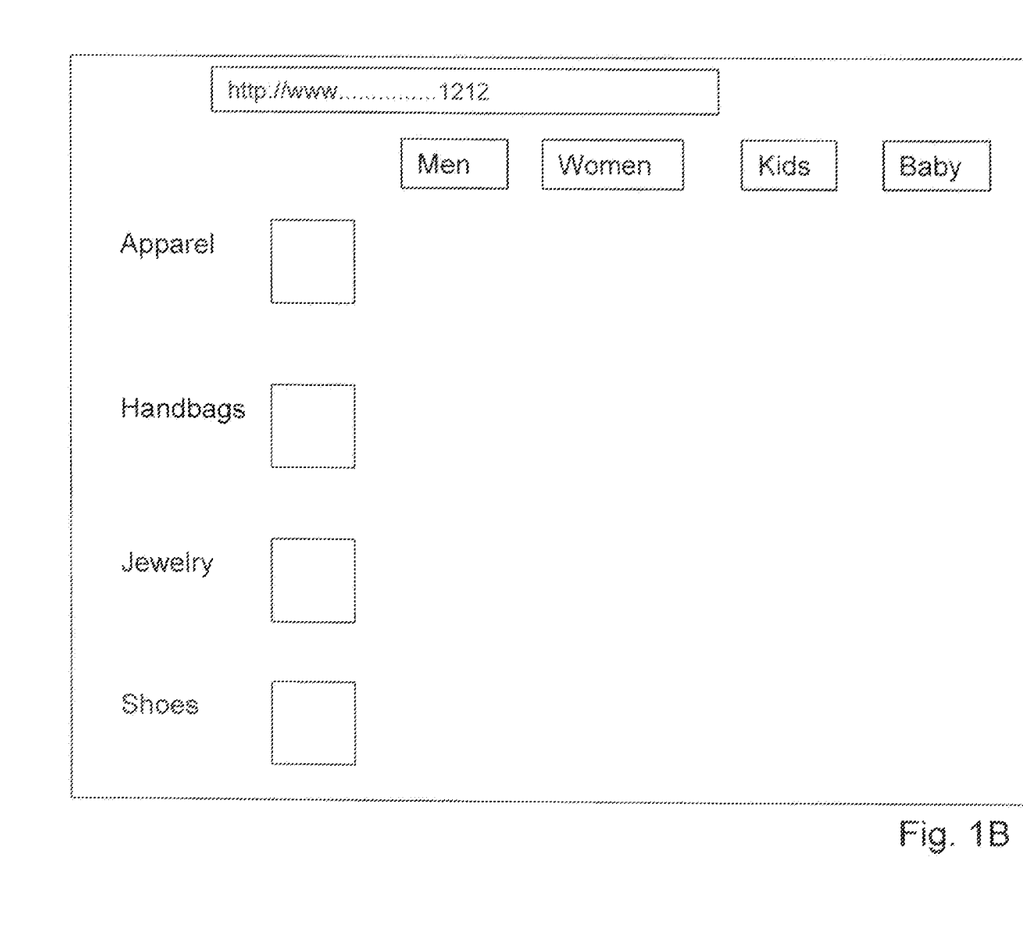
Figure 1C:
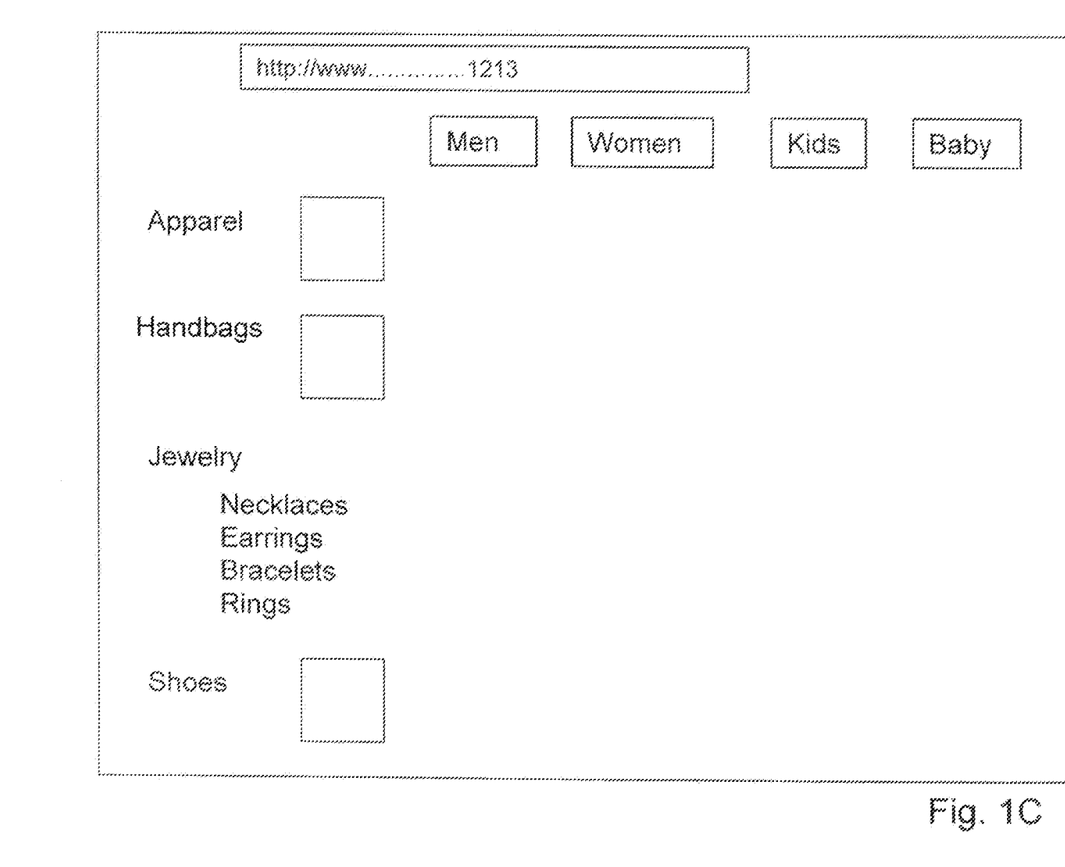
Figure 1D:
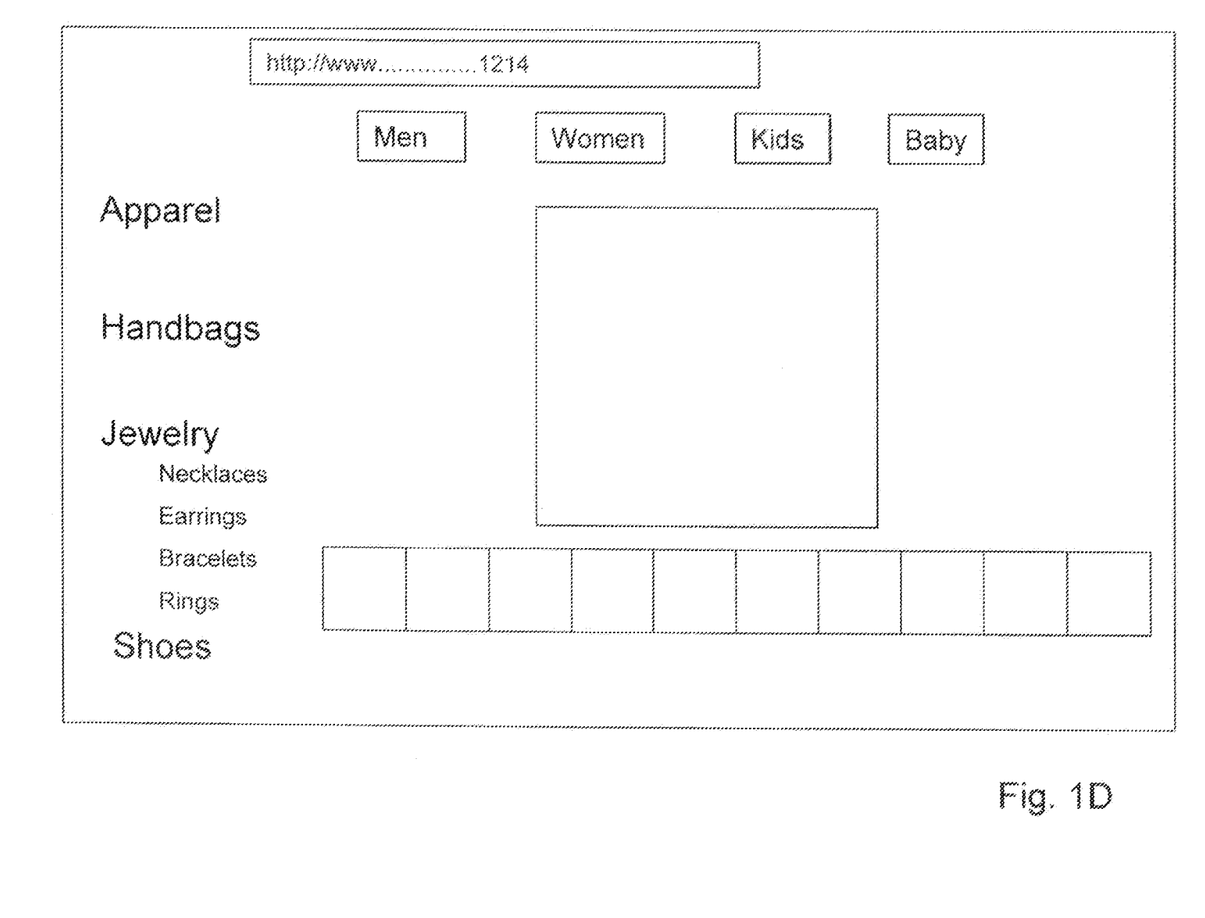

In addition to the first level categories "men", "women", "kids" and "baby" on the top, the webpage in FIG. 1B shows a number of second level categories on the left side: "apparel", "handbags", "jewelry", and "shoes". The web page shown in FIG. 1B could also include a few pictures, each representing a second level category. If the user were interested in the second level category "jewelry", the user would click on the word "jewelry" on the web page shown in FIG. 1B. A webpage such as the one shown in FIG. 1C then would be loaded and presented to the user.

In addition to the content shown in FIG. 1B, third level categories "necklaces", "earrings", "bracelets", and "rings" are shown under "jewelry". The web page in FIG. 1C could also include a few pictures, each representing a third level category. If the user were interested in the third level category "necklaces", the user would click on the word "necklaces" on the web page shown in FIG. 1C. The webpage shown in FIG. 1D then would be loaded and presented to the user. In the web page shown in FIG. 1D, there may be thumbnail images of a number of necklaces at the bottom for the user to find out what is available, and a big image in the center of the web page so that the user can look at one necklace more closely. To move another necklace to the center of the web page, the user has to click on one of the thumbnail images.

Thus, to move from one category level to another category level, the user has to click on a web page, and wait for another web page to be loaded and presented. To look at an interesting item more closely, the user has to click on a thumbnail image to move the image of the item to the center of the web page. For the 4 level category shown in FIGS. 1A, 1B, 1C and 1D, to get to the item in which the user is interested, the user has to click four times and wait for four web pages to be loaded. This is not very convenient to the user. In addition, when the Internet connection is slow, the process could be quite time consuming.

It would be desirable to provide a method that allows for smoother, more convenient and more intuitive category navigation.

BRIEF DESCRIPTION OF THE DRAWINGS

Embodiments of the present invention are described herein with reference to the accompanying drawings, similar reference numbers being used to indicate functionally similar elements.

DETAILED DESCRIPTION

The present invention presents a visual browsing method that allows the user to look at an item more closely, or find out more information about the item, by hovering a mouse over, instead of clicking on, an icon for the item. The method also allows the user to browse items in different levels of a multiple level category without waiting for web pages to be loaded, to know where he/she has been in the multiple level category, and to back up if he/she likes. Thus, the invention makes the browsing process faster and easier. Advantages of the present invention will become apparent from the following detailed description.

Figure 2:
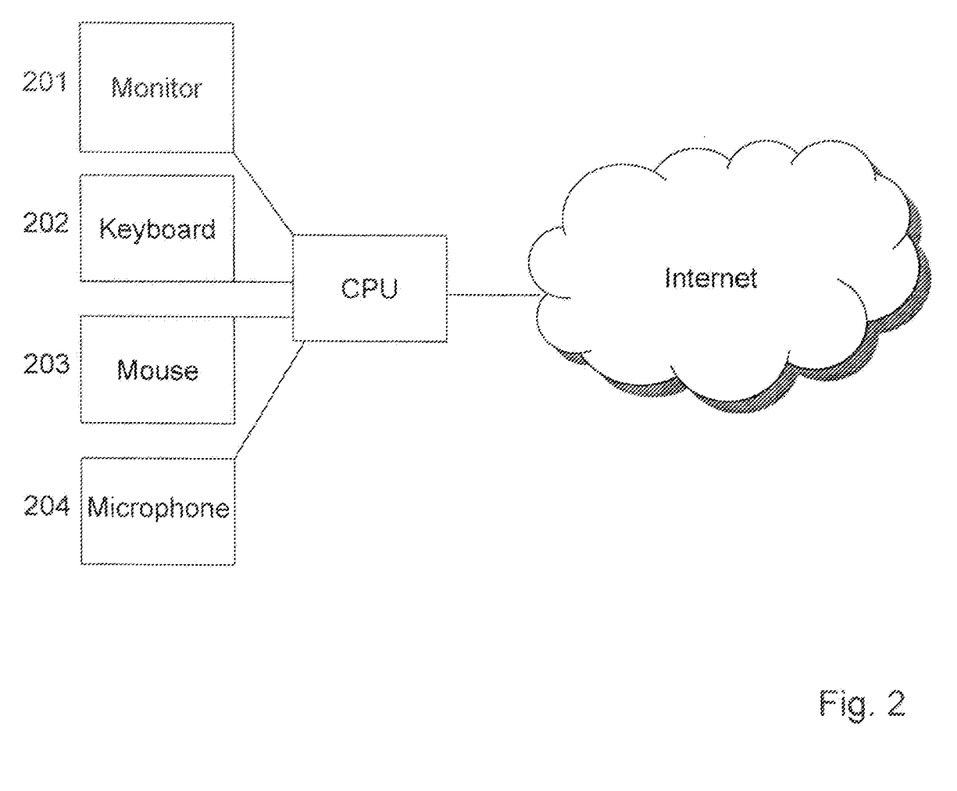
FIG. 2 illustrates a computer system in which the invention may be implemented.

The invention may be implemented in processor-based systems, including but not limited to: personal computers, handheld or laptop devices (including but not limited to mobile phones which may include smartphones), microprocessor-based systems, set top boxes, and programmable consumer electronics. As shown in FIG. 2, which is a non-limiting example, the processor-based systems may include an integral or a peripheral screen 201, an input device (e.g., a keyboard 202, a mouse 203 or a microphone 204), a processing unit, and volatile and/or nonvolatile memory or other storage. The invention could be carried out by computer-executable instructions, such as program modules.

In one embodiment, the invention is implemented using Flash™ coding techniques, because of ease of multi-level graphical representations using that programming tool. However, the invention is not limited to a particular programming tool, technique, or technology.

Figure 3A:
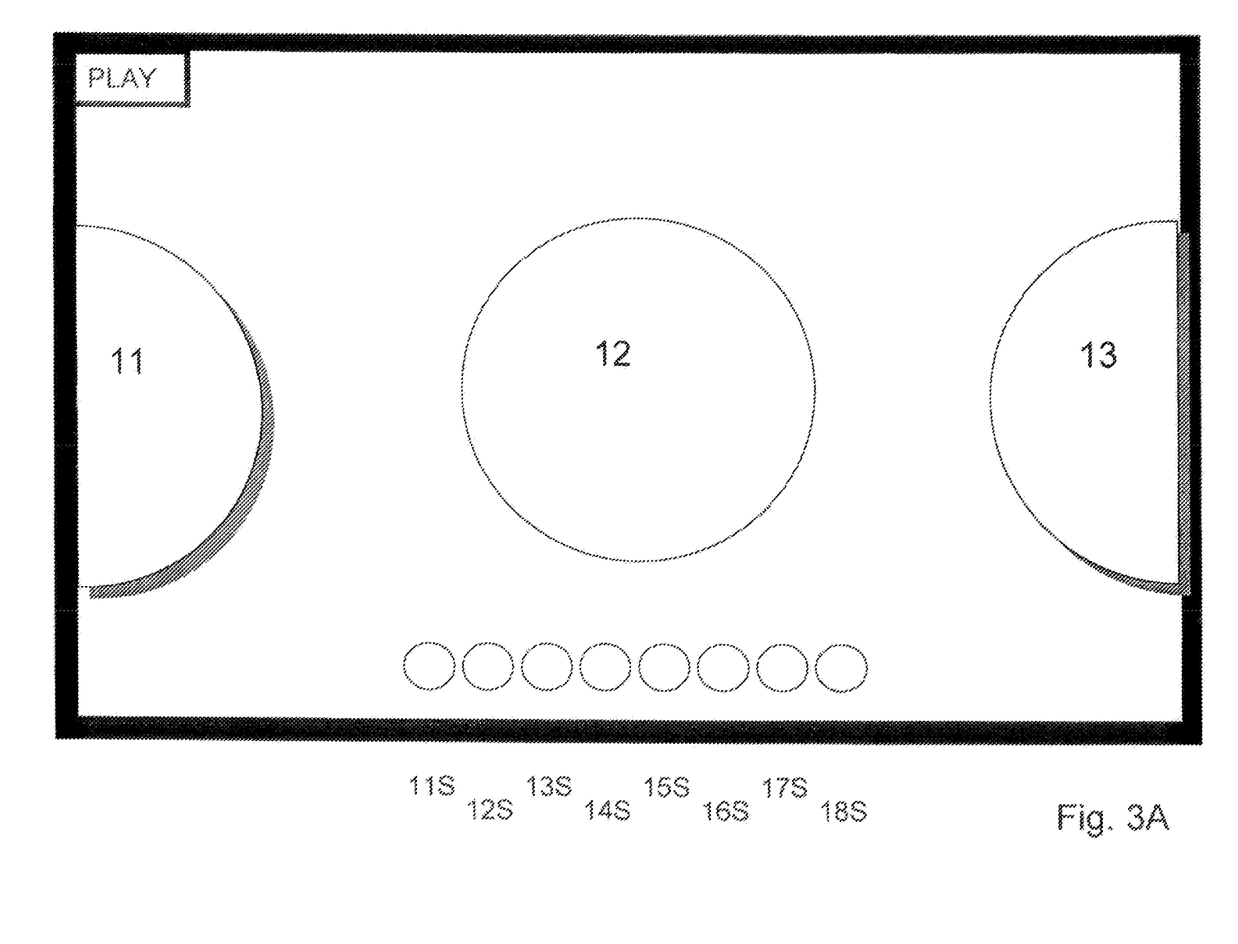
FIGS. 3A, 3B and 3C illustrate user interfaces of an on-line shopping website according to an embodiment of the present invention.
Figure 3B:
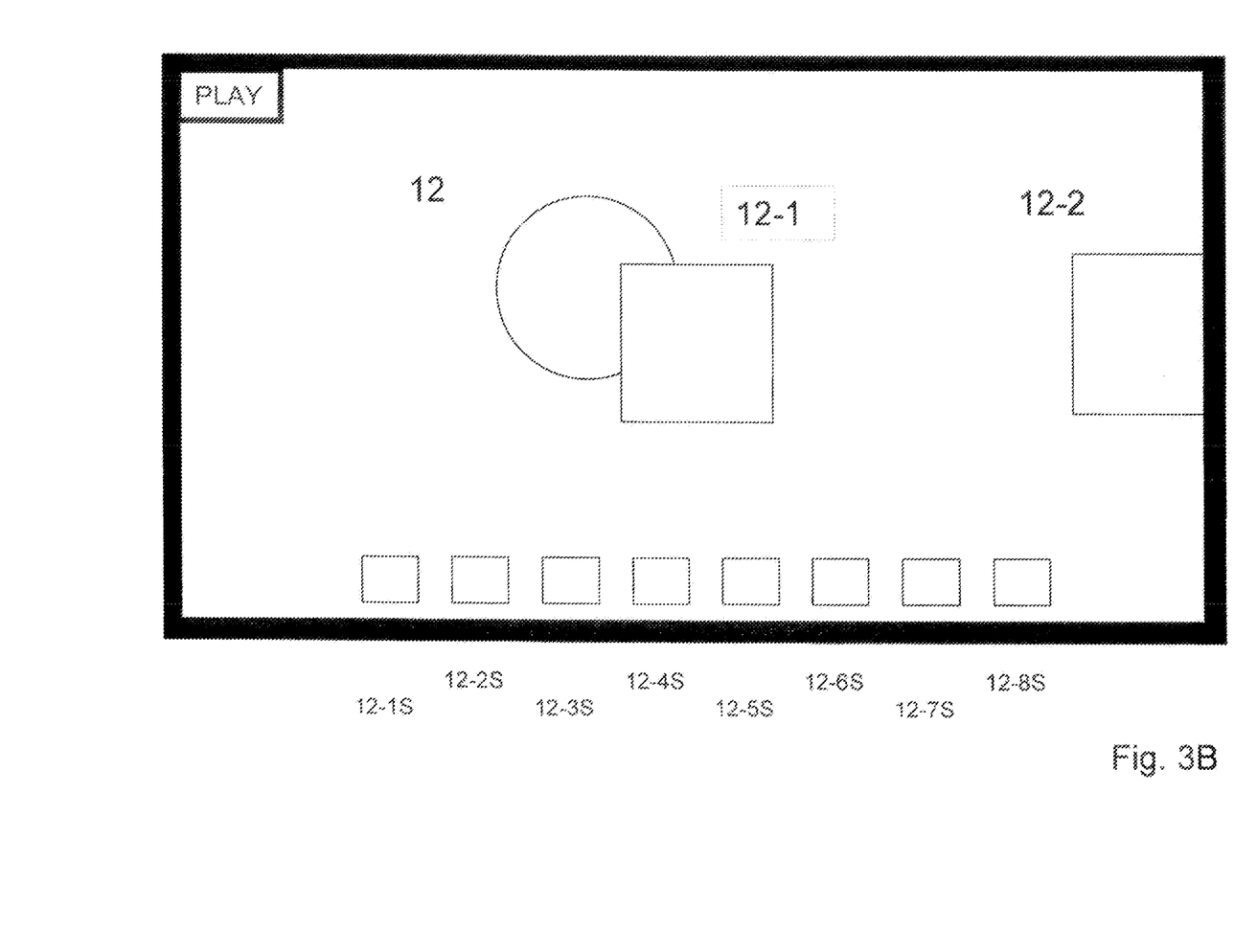
Figure 3C:
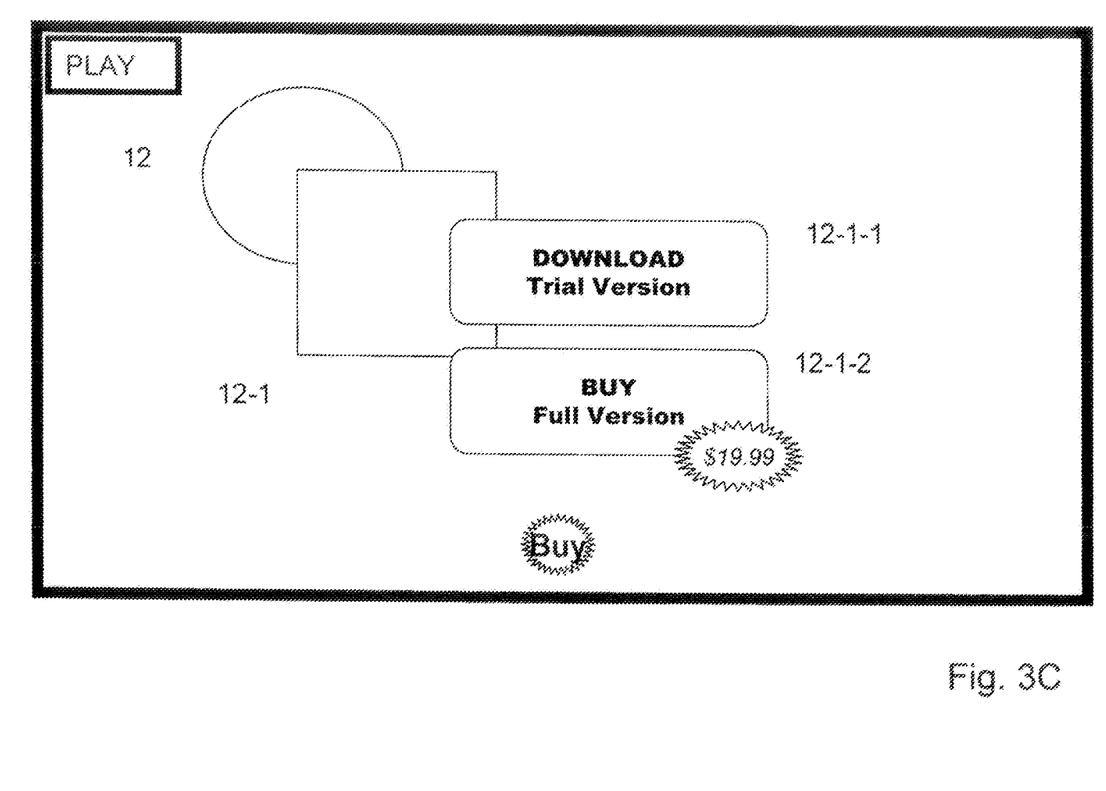

FIGS. 3A, 3B and 3C illustrate user interfaces of an on-line game shopping website according to one embodiment of the present invention. FIG. 3A shows the top level screen that a user sees first. At the bottom of the screen, there is a row of small circles 11s-18s, representing catalog items at the first level. In one embodiment, each small circle may represent a type of game available in a game catalog, e.g., 11s for arcade, 12s for board, 13s for card, 14s for puzzle, 15s for word, 16s for multiplayer games, 17s for video games, and 18s for skill games.

In the middle of the screen, there is a row of large circles 11-13. Each of the large circles may be a mirrored image of a small circle, and may correspond to the same content/catalog choice of a small circle, e.g., the large circle 12 may correspond to the small circle 12s. Circles are one example of a geometric shape in which the categories may be represented; the invention is not limited to a particular geometric shape, nor is it required that the larger shapes be the same configuration as the smaller shapes.

By scrolling through the small circles, the user moves to the center of the screen the large mirrored image of a small circle over which the user's mouse is hovering. The user "scrolls" through the small circles by simply causing the mouse to hover over and in between the small circles. In the embodiment shown in FIG. 3A, if the user wants to look at board games more closely, the user would cause the mouse to hover over the small circle 12s. Consequently, the small circle 12s may be highlighted, and the corresponding large circle 12 may be moved horizontally to the center of the screen. The user's mouse only hovers over the small circle, and does not have to click on the small circle.

The user now can scroll through the content in the large circle. If the user is interested in the type of game represented by a large circle, e.g., board game 12, the user can select the large circle 12 by clicking on it. Consequently, as shown in FIG. 3B, the selected large circle 12 moves to the back (in one embodiment, the Z plane in a 3-D representation; particular identification of the axis of directional movement is not critical). Catalog items at the second level, which are included in the catalog item represented by the large circle, may be presented on the screen as small squares 12-1s, 12-2s . . . to 12-8s and their large mirrored image, e.g., large squares 12-1 and 12-2. Although the user interface now appears different in FIG. 3B from the one shown in FIG. 3A, no new web page has been loaded. It also should be noted that the square shape in the described embodiment could be another shape, and that the smaller additional shapes could be different from the larger additional shape.

In the embodiment shown in FIG. 3B, the large squares are shown in the middle of the screen, and small squares are shown at the bottom of the screen. It should be understood that the large and small squares could be shown at other places on the screen. To make the large squares the focus of the new screen, the large circle 12 could be de-highlighted and/or reduced in size.

In FIG. 3B, the small squares may represent a number of board games, for example: Chess 12-1s, Trivial Pursuit 12-2s, Monopoly Here and Now 12-3s, Literati 12-4s, Dominoes 12-5s, Backgammon 12-6s, Checkers 12-7s, and Risk II 12-8s. Similarly, if the user selects the large circle 14 representing puzzle type games, the large squares may represent sub-catalog items of this type of game.

If the user is interested in the game "chess", the user can cause the mouse to hover over the small square 12-1s. Consequently, the small square 12-1s may be highlighted, and the corresponding large square 12-1 may be moved horizontally to the center of the screen. The user can move the large squares representing the games to the center of the screen by scrolling or causing the mouse to hover over and in between the small squares, but does not have to click on the small square.

If the user is interested in a game represented by a large square, e.g., chess 12-1, he/she could select the large square 12-1 by clicking on it. Consequently, as shown in FIG. 3C, the selected large square 12-1 may be pushed back in the Z plane, with large circle 12 being pushed back farther in the Z plane. Purchase options "Download Trial Version" and "Buy Full Version" then may be presented in the center of the screen. To make the purchase options the focus of the screen, the large circle 12 and the large square 12-1 could be de-highlighted and/or reduced in size. The user interface may change from the one in FIG. 3B to the one in FIG. 3C, but no new web page need be loaded.

From the interface in FIG. 3C, the user not only has the option to either download a trial version of the game of interest (12-1-1) or purchase the game (12-2-2), but also can see the path he/she followed by viewing the large square 12-1 representing the selected game "chess", and the large circle 12 representing the selected game type "board" in the Z plane. In addition, the user can track his steps back any time by clicking through the process. If the user clicks the large square 12-1, the interface will go back to the one shown in FIG. 3B, so that the user can look at and choose other board games if desired. If the user clicks the large circle 12, the interface will go back to the one shown in FIG. 3A to enable to user to look at and choose other types of games. The breadcrumb trail shows the user the history of the decision making process and allows the user to visually jump around the catalog, without having to wait for any web page to be loaded or re-loaded.

Thus, if the user wants to move between different levels of the category, he/she needs to click on a large mirrored image (large circle 12 for board type games, and large square 12-1 for chess) representing the level. However, if the user wants to browse items in a certain level in the category, he/she only needs to cause the mouse hover over the icons to move the one he/she is interested in to the center of the screen, instead of clicking on the icons.

Figure 4:
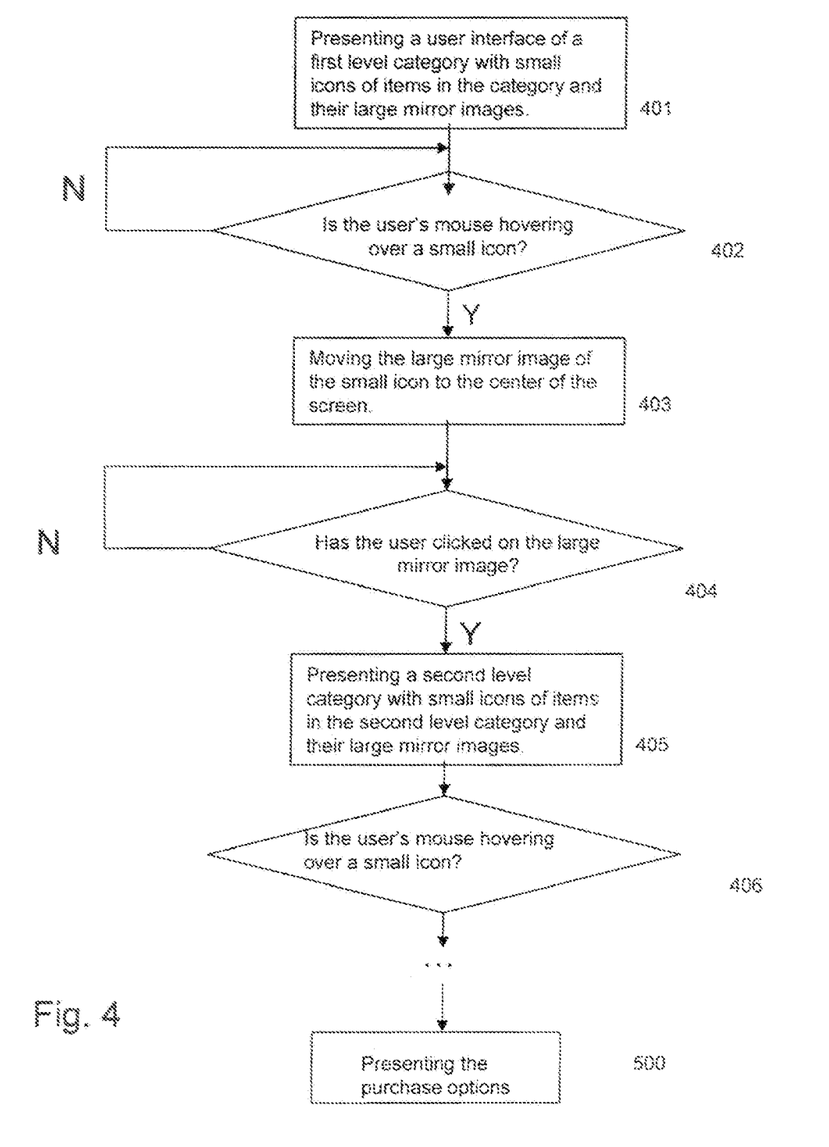
FIG. 4 is a flow chart for a visual browsing method according to one embodiment of the present invention.

FIG. 4 is a flow chart for a visual browsing method according to one embodiment of the present invention. In FIG. 4, a user interface of a first category level, with small icons of items in the first category level and their large mirrored images, is presented to the user (401). Next, it is determined whether the user's mouse is hovering over a small icon (402). If not, the program will continue to wait. Otherwise, the program will proceed by moving the large mirrored image of the small icon, over which the user's mouse is hovering, to the center of the screen (403). It should be understood that the large mirrored image could be placed at other locations on the screen, as long as it is conspicuous and can be viewed by the user easily.

Next, it is determined whether the user has clicked on the large mirrored image (404). If not, the program will continue to wait. If the user has clicked or used some other method to commit the selection, e.g., by key entries or voice commands or visible cues, the second level category is presented on the screen, with small icons being presented as well as their large mirrored images (405). It should be understood that the icons could be placed in other ways. As discussed above, the program could show the history of the user's browsing on the screen by keeping the large mirrored image of the previous level in the category on the screen, but pushing it back in the Z plane.

If the category includes more levels, 402-405 could be repeated (406). When the user finds the item in which he/she is interested, purchase options will be presented (500).

Anytime the user wants to go back to the level of category he/she browsed before, he/she could just click on the large mirrored image representing that level of category, such as the large circle 12 for game type "board" and the large square 12-1 for game "chess", as shown in FIG. 3C.

The embodiment shown in FIGS. 3A, 3B and 3C relates to shopping for on-line games, which could be downloaded to a computer and played on the computer. It should be understood that the invention could be used on game consoles, such as Wii™, PlayStation™ and XBox™. The user could browse games with his/her game console and download the games he/she likes to the console.

Figure 5:
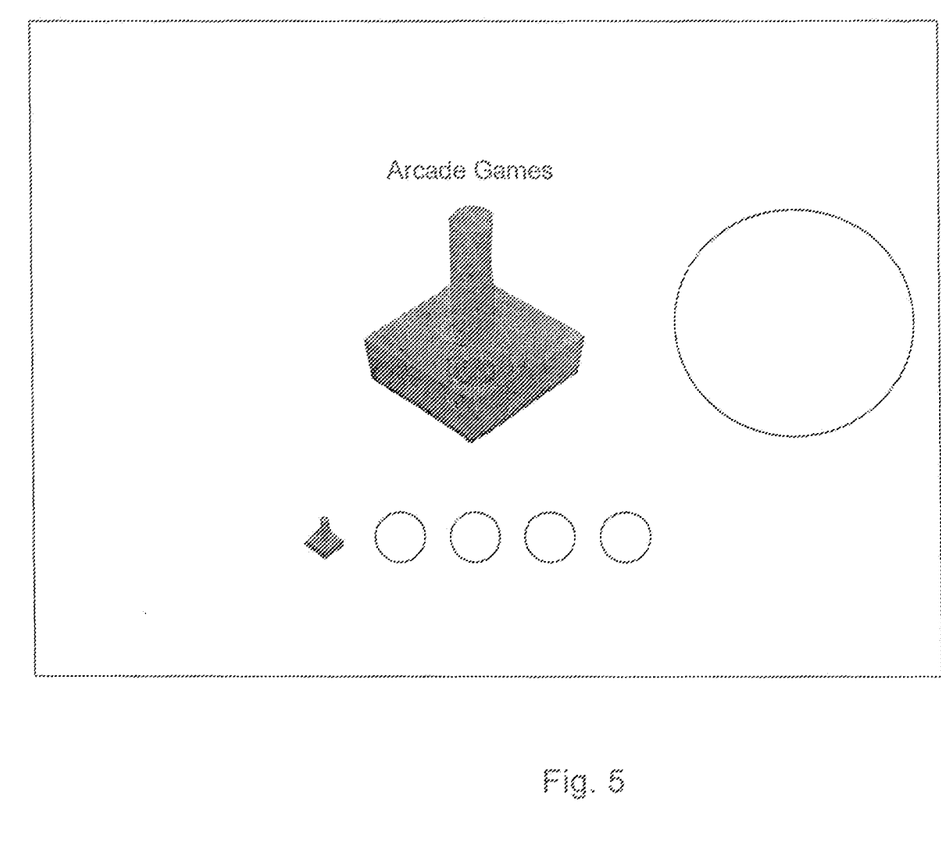
FIG. 5 illustrates a user interface of an on-line shopping website according to another embodiment of the present invention.

FIG. 5 illustrates a user interface of an on-line shopping website according to another embodiment of the present invention. The embodiment of FIG. 5 presents to users graphical images of items in a multiple level category. Similarly to FIG. 3A, in FIG. 5, there is a row of small circles at the bottom of the screen representing catalog items at the first level, and there is a row of large circles in the middle of the screen. When a user hovers the mouse over the small circle for Arcade games, a small graphical image of Arcade games replaces the small circle for Arcade games. At the same time, a large graphical image of Arcade games replaces the large circle for Arcade games and is moved to the center of the screen. In a further embodiment, the name of the games, "Arcade Games", is shown on the screen, close to the large graphical image of the game. If the user is interested in Arcade games, the user can click on the large graphical image. Similarly to FIG. 3B, the large graphical image may then be moved back in the Z plane, while small graphical images for catalog items at the second level, different types of Arcade games, may be presented at the bottom of the screen.

The invention also can be used in other commercial environments, such as music, clothing, or other sales situations. For example, the icons for the first category could be music genres, and the icons for the second category could be artists. Icons for a further category could be for a particular artist. The point here would be that ultimately the user would get through a series of categories or levels, ultimately to a place where a trial download or a purchase decision could be made.

The purchase options, the rectangles 12-1-1 and 12-1-2 shown in FIG. 3C, could be "Buy" and "Listen to samples".

Another embodiment of the invention may be used for on-line ticket selling of a ticket agency, a sports franchise, a theater chain, or the like. For example, a first category could be a particular type of event, such as sports; a second category could be a particular sport; the next category could be a particular team, or level (e.g. minor league or major league); and a further category could be the particular event for which tickets can be purchased. For a theater chain, the first category could be a location or a movie genre; further categories could lead the user to a particular theater and performance time through different paths.

The purchase options, the rectangles 12-1-1 and 12-1-2 shown in FIG. 3C, could be "Buy ticket now" and "View the trailer".

Another embodiment of the present invention may be used for browsing a news website, which could be a particular news service, newspaper chain, or individual newspaper. The first category could be type of news, such as local, world, financial, business, politics, technology, sports, or entertainment, or a particular newspaper. The second category could represent sub-categories of a selected news category. For sports, the sub-categories could be, for example, tennis, basketball, soccer, baseball, golf, football, or hockey.

As can be seen from the foregoing, the present invention provides a pictorial scroll bar. The user interaction required for browsing items in one level in a multiple level category is only to move the mouse around, without having to click on anything. As long as the user places the mouse near or over one of the small geometric shapes, a larger shape will be brought into view in the center of the screen. If the user is interested in a different level in the category, he/she can select that category level by, e.g., clicking on a large mirrored image representing an item in that level. The user will then get to the selected category level, without waiting for a new web page to be loaded. The large mirrored image for the previous level can stay in the background on the screen, so that the user knows where he/she has been in the category and can click on the image in the background to back up. The method can be applied to any corpus of hierarchical items with multiple levels.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method comprising:
simultaneously displaying:
in a first display area, a plurality of icons representing a plurality of items, wherein the plurality of icons includes a first icon and a second icon;
in a second display area, a first image that is a larger representation of the first icon;
in the second display area, at least a portion of a second image that is a larger representation of the second icon;
while the second display area displays the first image, receiving user input that moves a pointer within the first display area, wherein the user input qualifies as an expression of interest for the second icon;
responsive to the user input qualifying as an expression of interest for the second icon, displaying the second image in the second display area by horizontally scrolling the second image to the center of the second display area while the second icon is simultaneously displayed in the first display area without displacing the second icon in the first display area;
wherein the method is performed by one or more devices comprising a processor.

2. The method as recited in claim 1, wherein the user input comprises hovering over the second icon in the first display area.

3. The method as recited in claim 1, wherein the user input comprises sound input associated with the second icon in the first display area.

4. The method as recited in claim 1, wherein the user input comprises selecting the second icon in the first display area.

5. The method as recited in claim 1, wherein the plurality of icons displayed in the first display area represent items at a current level of a hierarchy of items.

6. The method as recited in claim 1, wherein prior to receiving the user input that moves the pointer within the first display area, displaying in the second display area, at least a portion of the second image that is a larger representation of the second icon comprises displaying near a center of the second display area, at least a portion of the second image that is a larger representation of the second icon.

7. The method as recited in claim 1, wherein the plurality of icons comprises a plurality of images.

8. A method comprising:
simultaneously displaying:
in a first display area, a first plurality of icons representing items that belong to a current level in a hierarchy of items, wherein the first plurality of icons comprises a first icon representing a first item that belongs to the current level and a second icon representing a second item that belongs to the current level;
in a second display area, a first image that is a larger representation of the first icon displayed in the first display area, wherein the first image was displayed in the second display area in response to receiving user input that qualifies as an expression of interest for the first icon;
in the second display area, at least a portion of a second image representing a third item that belongs to a second level in the hierarchy of items, wherein the third item is not represented by any icon displayed in the first display area, and wherein the second image appears to be behind the first image;
wherein the method is performed by one or more devices comprising a processor.

9. The method as recited in claim 8, wherein:
the second level in the hierarchy of items is a parent level of the current level in the hierarchy of items; and
within the hierarchy of items, the items represented by the first plurality of icons are immediate children of the third item.

10. The method as recited in claim 8, further comprising displaying, in the second display area, at least a portion of a third image representing a fourth item that belongs to a third level in the hierarchy of items, wherein the third image appears to be behind the second image.

11. A method comprising:
simultaneously displaying:
in a first display area, a first plurality of icons representing items that belong to a current level in a hierarchy of items, wherein the first plurality of icons comprises a first icon representing a first item that belongs to the current level and a second icon representing a second item that belongs to the current level;
in a second display area, a first image that is a larger representation of the first icon displayed in the first display area, wherein the first image was displayed in the second display area in response to receiving user input that qualifies as an expression of interest for the first icon;
in the second display area, at least a portion of a second image representing a third item that belongs to a second level in the hierarchy of items, wherein the third item is not represented by any icon displayed in the first display area;
responsive to receiving user input selecting the second image, simultaneously displaying:
in the first display area, a second plurality of icons representing items at the second level in the hierarchy of items; and
in the second display area, the second image without the first image;
wherein the method is performed by one or more devices comprising a processor.

12. A method comprising:
simultaneously displaying:
in a first display area, a first plurality of icons representing items that belong to a current level in a hierarchy of items, wherein the first plurality of icons comprises a first icon representing a first item that belongs to the current level and a second icon representing a second item that belongs to the current level;
in a second display area, a first image that is a larger representation of the first icon displayed in the first display area;
responsive to user input selecting the first image, simultaneously displaying:
in the first display area, a second plurality of icons representing items at a second level in the hierarchy of items;
in the second display area, a second image that is a larger representation of one of the second plurality of icons displayed in the first display area;
wherein the method is performed by one or more devices comprising a processor.

13. The method as recited in claim 12, wherein the second plurality of icons represents immediate children, of the first item, within the hierarchy of items.

14. A non-transitory computer readable storage medium comprising instructions, which when processed by one or more processors, cause:
simultaneously displaying:
in a first display area, a plurality of icons representing a plurality of items, wherein the plurality of icons includes a first icon and a second icon;
in a second display area, a first image that is a larger representation of the first icon;
in the second display area, at least a portion of a second image that is a larger representation of the second icon;
while the second display area displays the first image, receiving user input that moves a pointer within the first display area, wherein the user input qualifies as an expression of interest for the second icon;
responsive to the user input qualifying as an expression of interest for the second icon, displaying the second image in the second display area by horizontally scrolling the second image to the center of the second display area while the second icon is simultaneously displayed in the first display area without displacing the second icon in the first display area.

15. The computer readable storage medium as recited in claim 14, wherein the user input comprises hovering over the second icon in the first display area.

16. The computer readable storage medium as recited in claim 14, wherein the user input comprises sound input associated with the second icon in the first display area.

17. The computer readable storage medium as recited in claim 14, wherein the user input comprises selecting the second icon in the first display area.

18. The computer readable storage medium as recited in claim 14, wherein the plurality of icons displayed in the first display area represent items at a current level of a hierarchy of items.

19. The computer readable storage medium as recited in claim 14, wherein prior to receiving the user input that moves the pointer within the first display area, displaying in the second display area, at least a portion of the second image that is a larger representation of the second icon comprises displaying near a center of the second display area, at least a portion of the second image that is a larger representation of the second icon.

20. The computer readable storage medium as recited in claim 14, wherein the plurality of icons comprises a plurality of images.

21. A non-transitory computer readable storage medium comprising instructions, which when processed by one or more processors, cause:
  simultaneously displaying:
    in a first display area, a first plurality of icons representing items that belong to a current level in a hierarchy of items, wherein the first plurality of icons comprises a first icon representing a first item that belongs to the current level and a second icon representing a second item that belongs to the current level;
    in a second display area, a first image that is a larger representation of the first icon displayed in the first display area, wherein the first image was displayed in the second display area in response to receiving user input that qualifies as an expression of interest for the first icon;
    in the second display area, at least a portion of a second image representing a third item that belongs to a second level in the hierarchy of items, wherein the third item is not represented by any icon displayed in the first display area, and wherein the second image appears to be behind the first image.

22. The computer readable storage medium as recited in claim 21, wherein:
  the second level in the hierarchy of items is a parent level of the current level in the hierarchy of items; and
  within the hierarchy of items, the items represented by the first plurality of icons are immediate children of the third item.

23. The computer readable storage medium as recited in claim 21, further comprising additional instructions which, when processed by the one or more processors, cause displaying, in the second display area, at least a portion of a third image representing a fourth item that belongs to a third level in the hierarchy of items, wherein the third image appears to be behind the second image.

24. A non-transitory computer readable storage medium comprising instructions, which when processed by one or more processors, cause:
  simultaneously displaying:
    in a first display area, a first plurality of icons representing items that belong to a current level in a hierarchy of items, wherein the first plurality of icons comprises a first icon representing a first item that belongs to the current level and a second icon representing a second item that belongs to the current level;
    in a second display area, a first image that is a larger representation of the first icon displayed in the first display area, wherein the first image was displayed in the second display area in response to receiving user input that qualifies as an expression of interest for the first icon;
    in the second display area, at least a portion of a second image representing a third item that belongs to a second level in the hierarchy of items, wherein the third item is not represented by any icon displayed in the first display area;
  responsive to receiving user input selecting the second image, simultaneously displaying:
    in the first display area, a second plurality of icons representing items at the second level in the hierarchy of items; and
    in the second display area, the second image without the first image.

25. A non-transitory computer readable storage medium comprising instructions, which when processed by one or more processors, cause:
  simultaneously displaying:
    in a first display area, a first plurality of icons representing items that belong to a current level in a hierarchy of items, wherein the first plurality of icons comprises a first icon representing a first item that belongs to the current level and a second icon representing a second item that belongs to the current level;
    in a second display area, a first image that is a larger representation of the first icon displayed in the first display area;
  responsive to user input selecting the first image, simultaneously displaying:
    in the first display area, a second plurality of icons representing items at a second level in the hierarchy of items;
    in the second display area, a second image that is a larger representation of one of the second plurality of icons displayed in the first display area.

26. The computer readable storage medium as recited in claim 25, wherein the second plurality of icons represents immediate children, of the first item, within the hierarchy of items.

* * * * *